Figure 2:
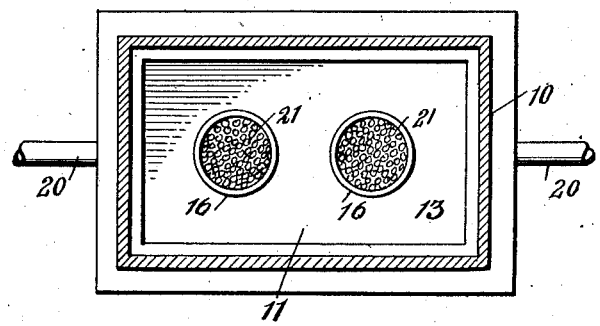

Jan. 5, 1926.

W. F. DOWNS 1,568,812

METHOD FOR TREATMENT OF LOW BOILING HYDROCARBONS

Filed May 6, 1922

INVENTOR
William F. Downs
BY
Dean, Fairbank, Albright & Hirsch
ATTORNEYS

Patented Jan. 5, 1926.

1,568,812

UNITED STATES PATENT OFFICE.

WILLIAM F. DOWNS, OF CHATHAM, NEW JERSEY; MARY GARDNER DOWNS ADMINISTRATRIX OF SAID WILLIAM F. DOWNS, DECEASED.

METHOD FOR TREATMENT OF LOW-BOILING HYDROCARBONS.

Application filed May 6, 1922. Serial No. 558,850.

*To all whom it may concern:*

Be it known that I, WILLIAM F. DOWNS, a citizen of the United States, and resident of Chatham, in the county of Morris and State of New Jersey, have invented certain new and useful Improvements in Methods for Treatment of Low-Boiling Hydrocarbons, of which the following is a specification.

The main object of the present invention is to increase the yield and improve the quality of gasoline obtained from hydrocarbon mixtures. In carrying out my improved process I make use of anhydrous aluminum or other metallic chlorides.

The fact that anhydrous aluminum chloride is a valuable agent in the treatment of mineral oils has been well known for many years, although there is not a unanimity of opinion as to the exact character or nature of the physical or chemical action by which it renders the treated hydrocarbon clean and sweet. By some form or forms of reaction there results a reduction in the amount of unsaturated compounds in the mixture. So far as I know, the various treatments of hydrocarbons by anhydrous aluminum chloride which have heretofore been employed involved the application of heat to a mixture of the oil and the aluminum chloride. If low boiling hydrocarbons are to be produced this heating has been carried to such a point that the low boiling oils are distilled from the mixture. The heating of the oil and aluminum chloride mixture results in a formation or separation of a tarry or coke-like residue rich in carbon. One objection which has heretofore been encountered is the high cost of the aluminum chloride and the fact that it loses its efficiency by becoming coated by or entangled with or combined with the free carbon or carbonaceous deposit or residue. The recovery of the aluminum chloride from this mixture and the rendering of it available for further use is an operation involving considerable expense.

In carrying out my improved process I do not distill the low boiling hydrocarbon from a liquid containing the anhydrous aluminum chloride, but I bring the hydrocarbon vapors or gases into contact with the anhydrous chloride maintained at a temperature below the point of volatilization of aluminum chloride or compounds thereof. The vapors or gases are caused to condense in the presence of or by the action of the anhydrous aluminum chloride, or are caused to filter through a bed of the latter.

By means of my improved process the aluminum chloride is kept entirely separate from and out of contact with the boiling oil, and the high boiling constitutents, and is not contaminated by, or its action interfered with or retarded by the coke-like or carbonaceous residue or deposit in the still.

The vapors or gases to be treated may be obtained from various different sources or combinations of sources, but for the producing of gasoline they are delivered at a temperature not materially above 500° F., so that the vapors of higher boiling point constituents are condensed or separated out before the vapors reach the aluminum chloride. For the purpose of this case I assume the temperature of about 500° F., as the dividing point between what may be considered as low boiling point oils and high boiling point oils. The temperature of the incoming gases or vapors may be maintained as much below 500° F. as desired, depending upon the boiling point of the desired final product, and the filter bed of aluminum chloride may be maintained at any desired temperature, also depending upon the desired boiling point for the final product. Obviously by maintaining the aluminum chloride filter bed at a comparatively high temperature the lowest boiling point constituents may pass through uncondensed.

The aluminum chloride with which the vapors come in contact acts to effect a reduction in the amount of unsaturated compounds, thereby improving the quality and I believe it acts to cause a combining of some of the lighter saturated and unsaturated compounds to produce a saturated compound in the range of boiling points designated commercially as gasoline. My investigations show that the condensing of the vapors in the presence of the aluminum chloride increases the yield of gasoline and I believe this is due to a catalytic action.

The aluminum chloride apparently reduces the vapor tension of the hydrocarbons and brings about reactions similar to those which take place when vapors resulting from a high temperature or cracking process are subjected to high pressure. The vapors, which vary as to their condition of saturation and formula of relation of hydrogen to carbon, apparently rearrange their molecular structure and the liquids which condense are largely gasoline of the best type.

In carrying out my process the pressure need not materially exceed atmospheric pressure at any point in the system, and in fact there may be a suction or reduction of pressure due to the condensation of the vapors which will cause a partial vacuum in at least a part of the system. I thus secure the desired result of increase in the yield and improvement in the quality of the gasoline which may be produced from a high boiling hydrocarbon, without the hazard and expense of high pressure and without the high cost due to the rapid loss of efficiency of the aluminum chloride and to the expensive regeneration process involved where the aluminum chloride is used directly in the still, or in a secondary vessel from which the liquid is distilled.

If the vapors which are to be treated are those which are obtained from a high boiling point oil, the still in which the latter is heated may be provided with a reflux condenser or other means whereby the vapor is cooled down to approximately 500° F., and the higher boiling point constituents of the vapor are separated out or returned to the still. The vapors may be produced from the heating of a low boiling hydrocarbon where it is merely desired to treat such oil and render it clean and sweet, or the vapors may include casing head gas or a mixture of gases or hydrocarbon vapors from various sources or gases or vapors from a cracking process or from any other process. They are preferably as dry as possible to prevent the loss of efficiency of the aluminum chloride by its absorption of the water vapor.

In order to insure the porosity of the filter bed or other body of the anhydrous aluminum chloride or other metallic chlorides, I have found it advantageous to mix in said bed or body inert substances. A mixture of silica and graphite has been found very satisfactory for this purpose.

Figure 1:
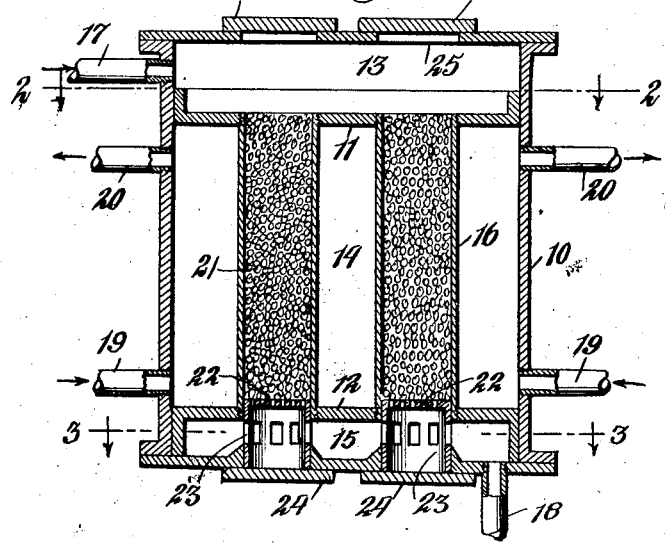

My improved process may be carried out in various different forms of apparatus. One such form and which includes structural features also included in my invention is shown in the accompanying drawings. In these drawings:

Fig. 1 is a central vertical section through the apparatus, and

Figure 3:
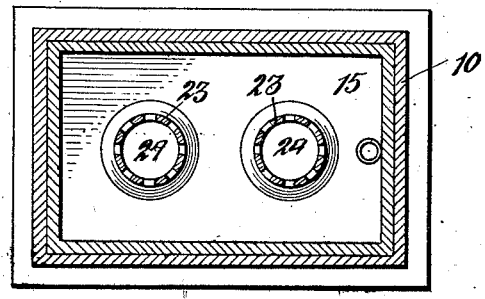

Figs. 2 and 3 are transverse sections on the lines 2—2 and 3—3 respectively of Fig. 1.

It will of course be evident that the apparatus illustrated is merely an example of an apparatus in which the process may be carried out, and that the action is not dependent upon the shape or size of the apparatus as a whole nor the number nor dimension or proportion of the filter beds.

In the apparatus illustrated there is provided a casing 10 having a pair of substantially horizontal transverse partitions 11 and 12 dividing the interior of the casing into upper, intermediate and lower compartments or chambers 13, 14 and 15. The two partitions 11 and 12 are connected by tubular members 16 which serve to carry the filter beds and form passages between the upper chamber 13 and the lower chamber 15. The vapors to be treated are admitted to the upper chamber 13 through a suitable inlet 17 and the final product is drawn off through an outlet 18 from the lower compartment 15. The intermediate compartment 14 which surrounds the tubes 16 and which is out of direct communication with the path for the hydrocarbon vapors or liquid, serves to receive or contain a temperature controlling liquid or gas. This chamber 14 may have one or more inlets 19 and one or more outlets 20 for the temperature controlling medium. The anhydrous aluminum chloride or other metallic chloride or mixtures of the same, and preferably with an inert substance, forms the filter beds 21 which are within the tubes 16. This porous mass or filter bed is supported on screens or perforated partitions 22, which latter may be carried by or supported on sleeves or tubes 23 extending through the lower compartment 15, and supported on removable cover plates 24. These tubes 23 may have perforations within the compartment 15 for the escape of liquid to the latter. The top wall of the casing may have openings 25 opposite to the ends of the several filter beds, and these may be closed by covers 26. When it is desired to remove the filter bed and substitute fresh material, the lower cover plates 24 and the tubes 23 may be removed, and the filter bed material will be free to drop out. If it has become caked it may be forced out from above by removing the cover plates 26. Fresh material may be inserted from the top upon the replacing of the tubes 23 and cover plates 24. All of the joints should be tight enough to exclude air from the apparatus and to prevent leakage between the chamber 14 and the chambers or passages for the hydrocarbon.

The tubes 16 are shown as being filled to the top with the material, but it will of course be evident that they may be filled to any desired level depending upon the purity or activity of the ingredients the character of the vapor or vapors acted upon, and the temperature maintained. The temperature of the medium in the chamber 14 should be below the volatilizing point of the aluminum chloride or compounds of the aluminum chloride and hydrocarbon if any such be formed, and this temperature may be as much below such volatilizing temperature as desired, depending upon the rapidity with which it is desired to remove heat from the vapors. The desired temperature may be obtained by varying the rapidity of circulation of the cooling medium as well as by varying the temperature of the medium itself.

In the operation of the apparatus to produce gasoline, the hydrocarbon vapors from the distilling apparatus or other source, and at a temperature not exceeding 500° F., are admitted to the chamber 13 through the inlet 17, and are distributed to the various filter bed chambers. These vapors there come in contact with the anhydrous aluminum chloride which causes a reduction in the volume of the vapors and an alteration to increase the degree of saturation of the compounds. The condensation is also caused by the conduction of heat through the walls of the tubes to the cooling medium. The condensate escapes through the screens 22 and tubes 23 to the chamber 15, and may be drawn off from the latter through the outlet 18 to any suitable storage tank.

The aluminum chloride has a very much longer life than when used directly in the boiling or heated oil, but will require replacement or purification from time to time due to moisture, sulphur compound or other impurities which may be brought to it with the vapors or due to clogging of the pores of the mass which interferes with free flow of the vapors or liquids and the most efficient contact of the active mass therewith.

Having thus described my invention, what I claim as new and desire to secure by Letters Patent is:—

1. The process of increasing the yield and improving the quality of gasoline from vapors of hydrocarbon oils having a boiling point below 500° F., and in which the component parts vary as to their ratios of hydrogen to carbon, and as to their condition of saturation, said process consisting in condensing said vapors in the presence of a porous mass containing anhydrous metallic chlorides and continuously withdrawing the liquid condensate from contact with the said chloride.

2. The process of increasing the yield and improving the quality of gasoline from vapors of hydrocarbon oils having a boiling point below 500° F., and in which the component parts vary as to their ratios of hydrogen to carbon, and as to their condition of saturation, said process consisting in filtering said vapors through and condensing them in a porous bed containing anhydrous aluminum chloride and continuously withdrawing the liquid condensate from contact with the said chloride.

3. The process of converting high boiling hydrocarbons into low boiling hydrocarbons, which comprises boiling the high boiling hydrocarbons, cooling the vapors to 500° F., separating the condensate, passing the uncondensed vapors into contact with anhydrous aluminum chloride condensing said vapors while in contact with said chloride, and immediately withdrawing the liquid condensate so formed.

4. The process of converting high boiling hydrocarbons into low boiling hydrocarbons, which comprises boiling the high boiling hydrocarbons, cooling the vapors to 500° F., separating the condensate, and condensing the remaining vapors in the presence of aluminum chloride maintained substantially free of liquid resulting from such condensation.

5. The process of producing low boiling hydrocarbons which consists in delivering hydrocarbon vapors at a temperature not over 500° F., into contact with anhydrous aluminum chloride maintained at a temperature below its point of volatilization, and so supported that the condensate is free to drain away from the aluminum chloride as fast as formed.

6. The process of producing low boiling hydrocarbons which includes passing the vapors thereof through and condensing them in a filter bed including aluminum chloride and an inert substance so supported that the condensate is free to drain away as fast as formed.

Signed at New York in the county of New York and State of New York this 1st day of May, A. D. 1922.

WILLIAM F. DOWNS.